US012101323B2

(12) United States Patent
Strogov et al.

(10) Patent No.: US 12,101,323 B2
(45) Date of Patent: Sep. 24, 2024

(54) SYSTEMS AND METHODS FOR PROTECTING WEB CONFERENCES FROM INTRUDERS

(71) Applicant: Acronis International GmbH, Schaffhausen (CH)

(72) Inventors: Vladimir Strogov, Moscow (RU); Serguei Beloussov, Costa Del Sol (SG); Stanislav Protasov, Singapore (SG)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 214 days.

(21) Appl. No.: 17/527,836

(22) Filed: Nov. 16, 2021

(65) Prior Publication Data
US 2022/0200996 A1 Jun. 23, 2022

Related U.S. Application Data

(60) Provisional application No. 63/129,713, filed on Dec. 23, 2020.

(51) Int. Cl.
*H04L 9/40* (2022.01)
*G06F 21/62* (2013.01)

(52) U.S. Cl.
CPC ........ *H04L 63/101* (2013.01); *G06F 21/6209* (2013.01); *G06F 21/6263* (2013.01); *H04L 63/102* (2013.01); *H04L 63/20* (2013.01)

(58) Field of Classification Search
CPC ..... H04L 63/101; H04L 63/102; H04L 63/20; H04L 63/0407; H04L 63/145;
(Continued)

(56) References Cited

U.S. PATENT DOCUMENTS 7,437,759 B1 * 10/2008 Szor ........................ G06F 21/52
726/25
8,621,628 B2 * 12/2013 Zeitlin ................... G06F 21/566
726/26
(Continued)

FOREIGN PATENT DOCUMENTS

EP           2824930 A1 *  1/2015  ............. H04N 19/42
WO    WO-2009072755 A2 *  6/2009  ............. G06F 21/10
WO    WO-2017009415 A1 *  1/2017  ............. G06F 21/53

*Primary Examiner* — Dereena T Cattungal
(74) *Attorney, Agent, or Firm* — ArentFox Schiff LLP; Michael Fainberg

(57) ABSTRACT

Disclosed herein are systems and methods for providing network protection for web-based conferencing services. In one aspect, an exemplary system comprises, a device comprising a processor, an operating system (OS) operable in a user mode and a kernel mode, and a kernel driver for performing operations while the OS is in kernel mode, the kernel driver configured to: monitor file operations that involve objects belonging to a web conferencing service, receive a request from an application executing in a user mode, the request being for an operation to be executed in the kernel mode, when the operation involves at least one object belonging to the web conferencing service, request for an authorization from a protection service executing in the user mode, and allow the operation to be performed only when the authorization is received from the protection service.

19 Claims, 4 Drawing Sheets

(58) Field of Classification Search
CPC ... H04L 63/403; H04L 63/123; H04L 65/403; H04L 67/02; G06F 21/6209; G06F 21/6263; G06F 21/52
See application file for complete search history.

(56) References Cited

U.S. PATENT DOCUMENTS

| | | | |
|---|---|---|---|
| 2014/0033271 A1* | 1/2014 | Barton | H04W 12/64 |
| | | | 726/1 |
| 2014/0075555 A1* | 3/2014 | Shilimkar | G06F 21/566 |
| | | | 726/23 |
| 2016/0004859 A1* | 1/2016 | Goodes | G06F 21/44 |
| | | | 726/17 |
| 2016/0285914 A1* | 9/2016 | Singh | H04L 63/1416 |
| 2018/0351968 A1* | 12/2018 | MacLeod | H04L 63/145 |
| 2021/0397710 A1* | 12/2021 | Cohen | G06F 21/552 |

* cited by examiner

SYSTEMS AND METHODS FOR PROTECTING WEB CONFERENCES FROM INTRUDERS

CROSS-REFERENCE TO RELATED APPLICATIONS

This application claims the benefit of U.S. Provisional Application No. 63/129,713, filed Dec. 23, 2020, which is herein incorporated by reference.

FIELD OF TECHNOLOGY

The present disclosure relates to the field of network protection for web-based conferencing services.

BACKGROUND

At present, telecommunications companies facilitate communications over their networks to support various types of services. These companies attempt to provide end-to-end security. Unlike for regular voice services, however, security is not as well supported for many other services.

For example, telecommunication programs for web conferences, remote meetings, distance e-learning are often very poorly protected from intruders. Attackers can infiltrate a web meeting session by injecting malicious processes, modifying registry keys in the operating system, and stealing confidential corporate data and personal information. Teleconferencing software, such as the software used for conferences on Zoom, provides network protection for the communication channel between the server and client. However, the endpoints are practically unprotected and are easily vulnerable if malware penetrates the user machine.

Thus, there is a need for providing protection not only for the channel between the server and the client, but the endpoints themselves.

SUMMARY

In one exemplary aspect, the techniques described herein relate to a method for providing network protection for web-based conferencing services, the method including: monitoring, by a kernel driver and a file system and registry filter, file operations to detect operations that involve objects belonging to a web conferencing service; receiving, by the kernel driver, a request from an application executing in a user mode, the request being for an operation to be executed in the kernel mode; when the operation involves at least one object belonging to the web conferencing service, requesting, by the kernel driver, for an authorization from a protection service executing in the user mode; and allowing, by the kernel driver, the operation to be performed only when the authorization is received from the protection service.

In some aspects, the techniques described herein relate to a method, wherein the monitoring is to detect file operations that perform at least one of: injecting processes, modifying registry keys in an operating system of the user endpoint device, and modifying at least one process of the web conferencing service.

In some aspects, the techniques described herein relate to a method, wherein the authorization is based on the application from which the request is received.

In some aspects, the techniques described herein relate to a method, further including: using a callback registration driver to register control callbacks which are called at process creation; and using the registered control callbacks for restricting access rights for creating processes and for actions during an open process.

In some aspects, the techniques described herein relate to a method, wherein an authorization for injecting of codes into running processes is based on verifications of signatures of running processes.

In some aspects, the techniques described herein relate to a method, wherein the protection service provides the authorization when the file operation is received from the application from an entity with a valid certificate.

In some aspects, the techniques described herein relate to a method, wherein the monitoring further includes: monitoring to detect operations that access memory designated for confidential or personal information.

In some aspects, the techniques described herein relate to a method, wherein the object is a registry item and the operation is modifying the registry item, wherein the protection service is configured to: detect, using a plurality of rules, whether modifying the registry item is associated with enabling access to a meeting without permission or direct invitation, activating a camera and/or microphone of a computing device executing an application of the web conferencing service, or storing a recording in a storage location accessible without permission.

In some aspects, the techniques described herein relate to a method, wherein the object is a file including code that controls transmission of audio and video content captured via the web conferencing service, wherein the operation includes modifying the file, and wherein the protection service is configured to block modification of the file if the modifying is requested by an unauthorized entity.

In some aspects, the techniques described herein relate to a system of a device for providing network protection for web-based conferencing services, including: a processor; an operating system (OS) operable in a user mode and a kernel mode; and a kernel driver configured to: monitor file operations that involve objects belonging to a web conferencing service; receive a request from an application executing in a user mode, the request being for an operation to be executed in the kernel mode; when the operation involves at least one object belonging to the web conferencing service, request for an authorization from a protection service executing in the user mode; and allow the operation to be performed only when the authorization is received from the protection service.

In some aspects, the techniques described herein relate to a system, wherein the monitoring is to detect file operations that perform at least one of: injecting processes, modifying registry keys in an operating system of the user endpoint device, and modifying at least one process of the web conferencing service.

In some aspects, the techniques described herein relate to a system, the authorization is based on the application from which the request is received.

In some aspects, the techniques described herein relate to a system, wherein the kernel driver is further configured to: use a callback registration driver to register control callbacks which are called at process creation; and use the registered control callbacks for restricting access rights for creating processes and for actions during an open process.

In some aspects, the techniques described herein relate to a system, wherein an authorization for injecting of codes into running processes is based on verifications of signatures of running processes.

In some aspects, the techniques described herein relate to a system, wherein the protection service provides the authorization when the file operation is received from the application from an entity with a valid certificate.

In some aspects, the techniques described herein relate to a system, wherein the kernel driver is further configured to: monitor to detect operations that access memory designated for confidential or personal information.

In some aspects, the techniques described herein relate to a system, wherein the object is a registry item and the operation is modifying the registry item, wherein the protection service is configured to: detect, using a plurality of rules, whether modifying the registry item is associated with enabling access to a meeting without permission or direct invitation, activating a camera and/or microphone of a computing device executing an application of the web conferencing service, or storing a recording in a storage location accessible without permission.

In some aspects, the techniques described herein relate to a system, wherein the object is a file including code that controls transmission of audio and video content captured via the web conferencing service, wherein the operation includes modifying the file, and wherein the protection service is configured to block modification of the file if the modifying is requested by an unauthorized entity.

In some aspects, the techniques described herein relate to a non-transitory computer readable medium storing thereon computer executable instructions for providing network protection for web-based conferencing services, including instructions for: monitoring, by a kernel driver and a file system and registry filter of a user endpoint device, file operations to detect operations that involve objects belonging to a web conferencing service; receiving, by the kernel driver, a request from an application executing in a user mode, the request being for an operation to be executed in the kernel mode; when the operation involves at least one object belonging to the web conferencing service, requesting, by the kernel driver, for an authorization from a protection service executing in the user mode; and allowing, by the kernel driver, the operation to be performed only when the authorization is received from the protection service.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for providing network protection for web-based conferencing services. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, a system for providing network protection for web-based conferencing services in accordance with the teachings of the present disclosure includes real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 4). Furthermore, components of the system may be realized either within a single computing device or spread out among several interconnected computing devices.

Figure 1:
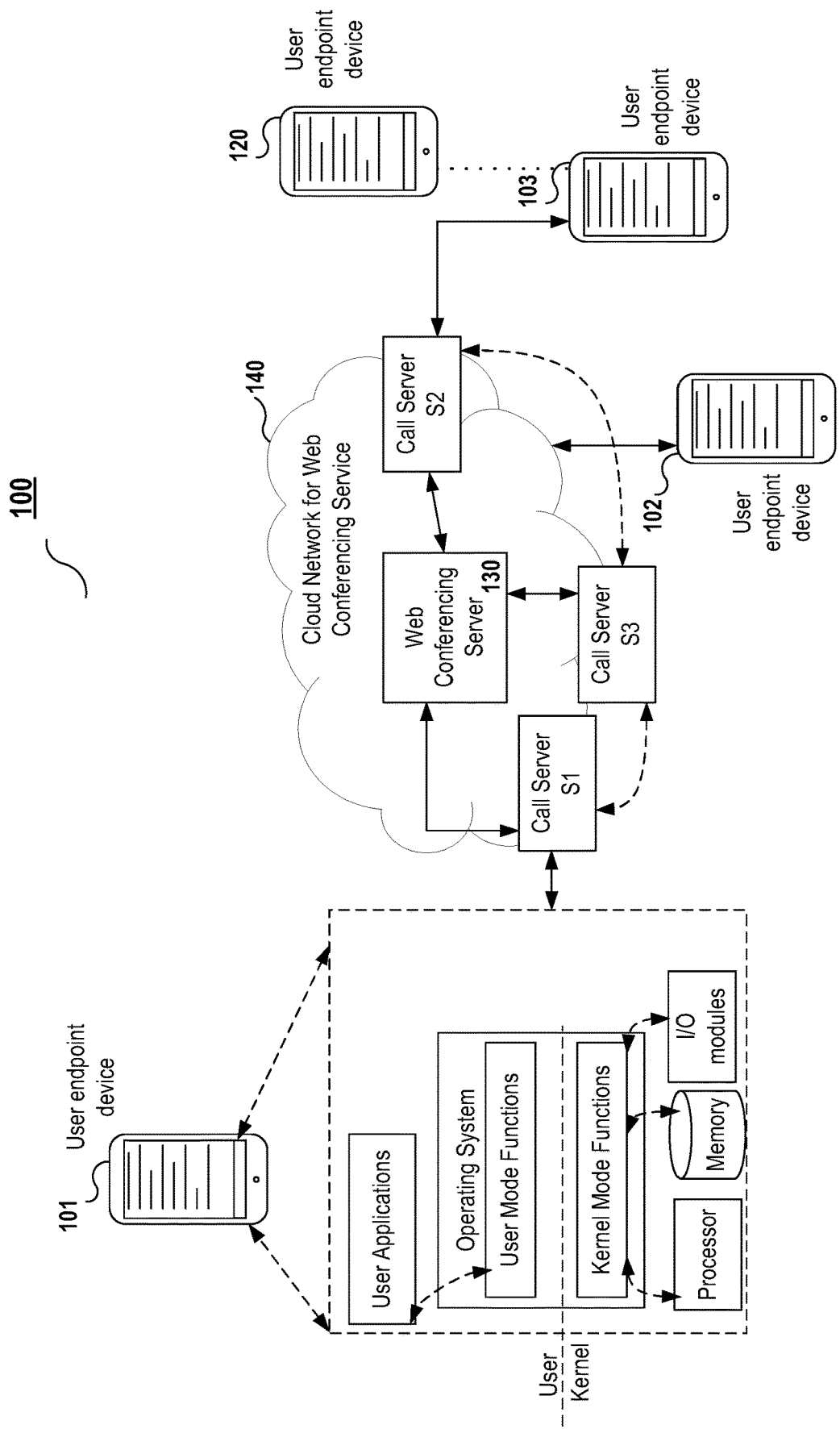
FIG. 1 is a block diagram illustrating an exemplary system for providing network protection for web-based conferencing services in accordance with aspects of the present disclosure.

FIG. 1 is a block diagram illustrating an exemplary system 100 for providing network protection for web-based conferencing services in accordance with aspects of the present disclosure. The system 100 for providing network protection for web-based conferencing services includes user endpoint devices 101, 102, 103, 120 and a cloud network 140 for web conferencing service. Only four endpoints are shown for simplicity, but any number of endpoints may be part of system 100. The cloud network 140 may be a network of a conference service (e.g., Zoom, Google Meets, Microsoft Teams, Google classroom, and the like). The cloud network 140 includes any number of servers 130 used for web conferencing and any number of call servers S1-S3. Some exemplary functions of the servers 130 include interacting with user endpoint devices for signaling and content transmission, selecting an input (e.g., audio, video, shared presentation, and so on), from one of the user endpoint devices for transmission towards the other user endpoint devices, transcoding to various formats, and transmitting to the other user endpoint devices. In one aspect, the transcoding may be performed by other servers.

For a web based conferencing event, a stream originates from devices, i.e., multiple video and audio devices, multiple shared screens, etc. Therefore, the web conference server 130 has to manage the various input streams to select which of the streams to send to all other endpoint devices on the conference. Then, the selected input stream is shared to all the conference participants via call servers. The user endpoint devices are generally chosen by the particular user of the endpoint. Accordingly, the output stream is converted to an appropriate format for each recipient user endpoint device. Therefore, transcoders are typically used between the call servers and the endpoint devices.

In most scenarios, the call servers themselves are interconnected in layers to limit the number of endpoints each device needs to serve. For example, endpoints 101-110 may connect to call server S1, endpoints 111-120 may connect to call server S2, etc. Then, call servers S1 and S2 may connect to the server 130, which is used for managing the inputs, via a call server S3.

The transcoding for endpoints 101-110 may be done between the call server S3 and the server 130 managing the input streams, or between call servers S1 and S3. Similarly, the transcoding for endpoints 111-120 may be done between the call server S3 and the server 130 managing the input streams, or between call servers S2 and S3.

Figure 2:
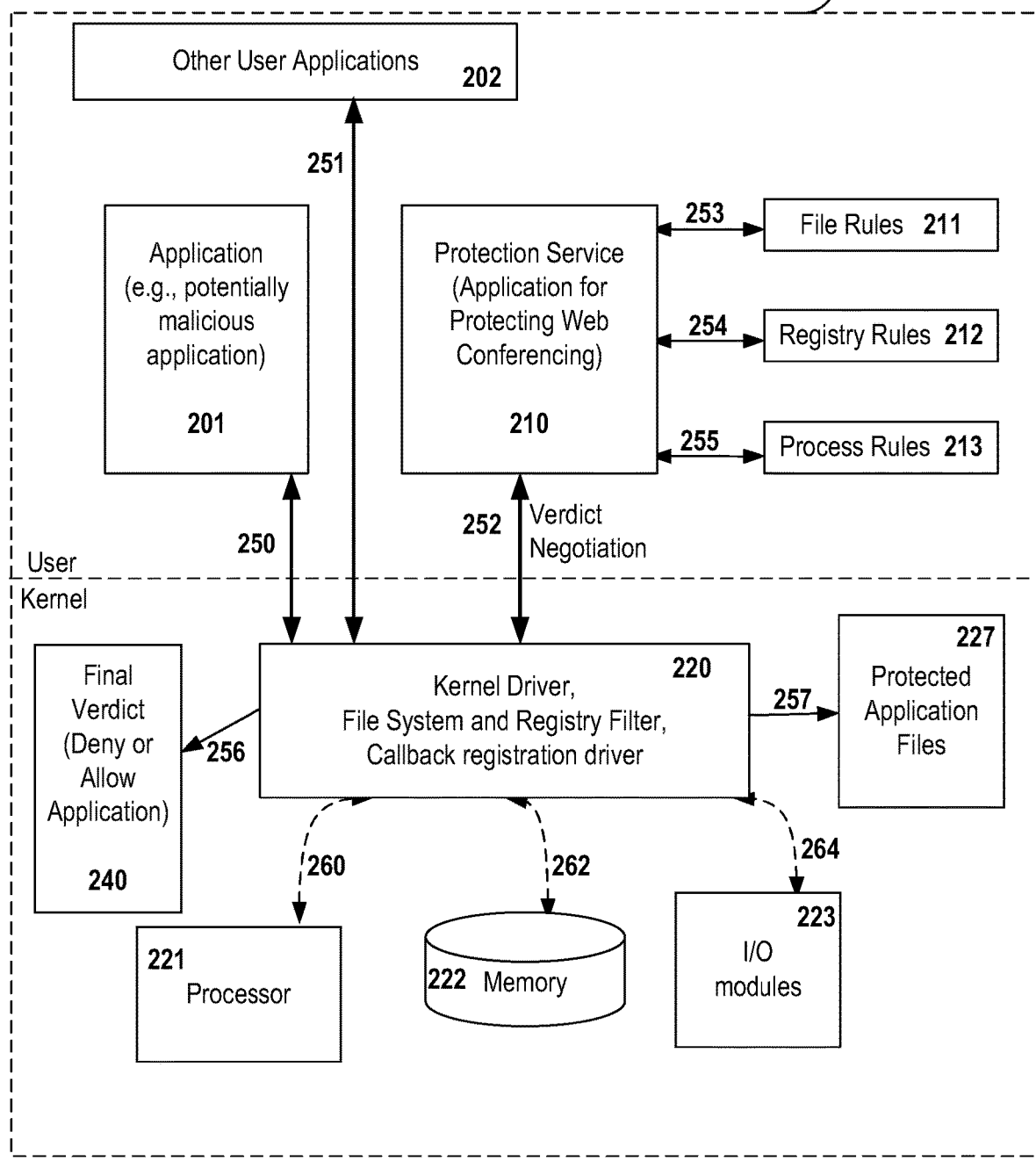
FIG. 2 is a block diagram illustrating an exemplary user endpoint device used for accessing a web-based conference service in accordance with aspects of the present disclosure.

FIG. 2 is a block diagram illustrating an exemplary user endpoint device 200 used for accessing a web-based conference service in accordance with aspects of the present disclosure. For example, the user endpoint device 200 may be any of the user endpoint devices 101-120 shown in FIG. 1.

The Operating System (OS) of the user endpoint device generally supports two modes: user mode and kernel mode. When the device is turned on, the OS starts in kernel mode. After the OS is loaded, user applications run in the user mode. Privileged instructions can be executed only in kernel mode. For example, interrupt instructions, I/O management, memory management, CPU scheduling, etc. are executed in the kernel mode. When the OS is running a user application, the system is in the user mode.

A transition to the kernel mode occurs when the application sends a request for executions that requires privileged access. Upon completion, the OS returns to the user mode. For example, suppose a system call occurs, for a user application 201 or 202. Then, the OS transition to the kernel mode occurs because the execution requires privileged access. Once the execution of the system call is finished, the transition back to the user mode follows.

Referring to FIG. 2, a user application 201 or 202 may be invoked by a user of the endpoint device to start an application. The application may be for starting a web conferencing session or for joining an ongoing web conferencing session. The user application 201 or 202, while executing in the user mode, may request for an operation that can be executed only in the kernel mode. Then, the OS transitions from the user mode to the kernel mode, as shown in 250 or 251. For instance, operations that access the processor 221 (e.g., scheduling), memory 222 (e.g., mapping), I/O modules 223 (e.g., access ports/interfaces), file rules 211, registry keys 212 (e.g., modifying registry keys), process rules 213 (e.g., altering processes or adding processes), protected application files 227, and the like are performed when the OS is in the kernel mode.

In order to protect the endpoint device, the method of the present disclosure enables certain operations to be performed only after the safety of the operations is confirmed. Thus, in one aspect, the method of the present disclosure provides protection for web conferencing services by: monitoring, by a kernel driver and a file system and registry filter, file operations to detect operations that involve objects belonging to a web conferencing service, such as Zoom; receiving, by the kernel driver, a request from an application executing in a user mode, the request being for an operation to be executed in the kernel mode; when the operation involves at least one object belonging to the web conferencing service, requesting, by the kernel driver, for an authorization from a protection service executing in the user mode; allowing, by the kernel driver, the operation to be performed only when the authorization is received from the protection service. Thus, the authorization specifies whether or not the operation is trusted.

For example, the kernel driver 220 receives the request from the application 201 or 202, as shown in 250 or 251 respectively. The kernel driver 220 utilizes the file system and registry filter to detect operations on objects related to a web conferencing application. Upon the detection, the kernel driver 220 sends a request to the protection service (i.e., application 210 used to protect web conferencing services), as shown in 252. The protection service 210 runs in the user mode. The file rules 211, registry rules 212, and process rules 213 may be accessed by the protection service 210, as shown in 253, 254 or 255, respectively. The protection service 210 determines whether or not the requested operation is allowed. For instance, adding a process, altering a registry key, etc. may not be allowed. Then, the verdict is returned to the kernel driver 220, as shown in 252. Based on the received verdict, the kernel driver 220 makes a final verdict either denying or allowing the operation to proceed, as shown in 256. In some implementation, protected application files 227 may be maintained to be accessed only in privileged mode (i.e., only in kernel mode).

Certain aspects of web-based conferencing services make them prime candidates for hackers to infiltrate a system. For example, web-based conferencing services normally access the camera and microphone settings of a computing device (e.g., a computer or a smartphone). This enables a malicious entity such as a hacker to eavesdrop on calls or at any time when the computing device is being used. For example, a malicious entity may inject code in a web-based conferencing application (e.g., Zoom) such that the application transmits a video/audio stream to the malicious entity at a given address whenever a call is taking place. In fact, the injection may enable access to the microphone and camera of a computing device even without displaying the user interface of the web-based conferencing application (and thus the user of the computing device may not even be aware that data is being sent to a malicious entity). This attack on privacy is highly dangerous because unlike attacks that perform data theft by stealing existing files (e.g., documents, images, etc.) in memory, in this case, information shared verbally or visually during calls can be stolen as well. File rules 211 may be used to detect execution of scripts that modify (e.g., inject code) into files of the web-based conferencing services. For example, a rule in file rules 211 may indicate that if a file with code that controls camera activation is modified by a script that is in a blacklist, the modification operation should not be authorized by protection service 210.

Certain web-based conferencing services also offer screen sharing and remote control features. These features enable users to share their visual user interfaces and allow the viewer to transmit commands to the computing device that is sharing its visual user interface, respectively. In this case, a malicious entity may also be able to view a stream comprising the screen contents transmitted via screen sharing. A malicious entity may even be able to take control via the remote control features.

As mentioned previously, malicious entities can infiltrate a web meeting session by injecting malicious processes, modifying registry keys in the operating system, and stealing confidential corporate data and personal information. Applications use the registry of an operating system as a repository of application-specific information (e.g., user preferences). Consider an example of a web-based conferencing application named "ExampleChat" running in a Windows environment. An example of registry options may be found under HKEY_LOCAL_MACHINE\SOFTWARE\Policies\ExampleChat\Meetings\General:

| Registry Item | Policy | Default Value |
|---|---|---|
| DisableCloudRecording | The client will disable the cloud recording feature | Enabled |
| DisableLocalRecording | The client will disable the local recording feature | Disabled |
| TurnOffVideoCameraOnJoin | Turn off video camera when joining the meeting | Enabled |
| ... | ... | ... |
| EnablePublicMeetingLink | Enable meeting links to be accessed publicly | Disabled |

A malicious entity may attempt to adjust some of the registry items to enable the malicious activity discussed above (e.g., eavesdropping). For example, an operation to change an object (e.g., a registry item) may involve disabling "TurnOffVideoCameraOnJoin," enabling "EnablePublicMeetingLink," and/or disabling "DisableCloudRecording." The intent behind these changes may be to ensure that the camera is activated immediately, calls are not private (e.g., meetings can be accessed without permission or direct invite from the user), and a recording is stored on the cloud from which the malicious entity can view the video.

Protection service 210 may employ registry rules that identify such changes and prevent them. For example, protection service 210 may identify all pathways to infiltrating the web-based conferencing application and generate rules that block the pathways. One pathway may involve enabling a registry item such as "EnablePublicMeetingLink" that was previously disabled manually by an authorized user or was disable by default. Accordingly, a rule may indicate that if an operation to enable "EnablePublicMeetingLink" is detected, to reject the operation. Protection service 210 may also factor in who is performing the operation. For example, if the operation is being performed by an authorized user (e.g., a consistent user of the computing device accesses the registry and requests enablement of the registry item), the operation may be authorized. However, if the request originates from an application that was installed within a threshold period of time from a website that is in a blacklist tracked by protection service 210, the request will not be authorized. Protection service 210 may also factor in a sequence of changes to the registry. For example, if "EnablePublicMeetingLink" alone is enabled, there may be no malicious activity. However, if "TurnOffVideoCameraOnJoin" is disabled and "DisableCloudRecording" is also disabled, then malicious activity may exist. A rule from registry rules 212 may thus indicate that an operation or a combination of operations that alter these three registry items should not be authorized.

Thus far, attacks involving code injections and registry access have been discussed. In some cases, a zero-day attack may also occur on a web-based conferencing application because of a vulnerability that the developer of the application has not identified and corrected. For example, the web-based conferencing application may have an encryption feature that stores keys in an accessible location. If a malicious entity accesses the keys, they can access the data exchanged between one or more users of the web-based conferencing application. Protection service 210 may utilize process rules 213 to detect activity by the web-based conferencing application such as the storage of encryption keys in an unprotected location. A rule may detect a process or thread that is writing keys to a file and another process (e.g., of a malicious application) that is reading the file where the keys are written. If the another process is identified as malicious (e.g., it lacks authorization credentials or is in a blacklist), the another process is blocked and the operation to access the file is terminated. This is simply one example of multiple pathways through which a web-based conferencing application can be identified. Although a zero-day attack is technically taking advantage of an unknown vulnerability, process rules 213 can still identify pathways that are commonly exploited for zero-day attacks in other applications. These pathways may be generalized (e.g., the detection of keys being stored in a file and the file being accessed by a malicious process) so that they may be applicable to any web-based conferencing application.

Figure 3:
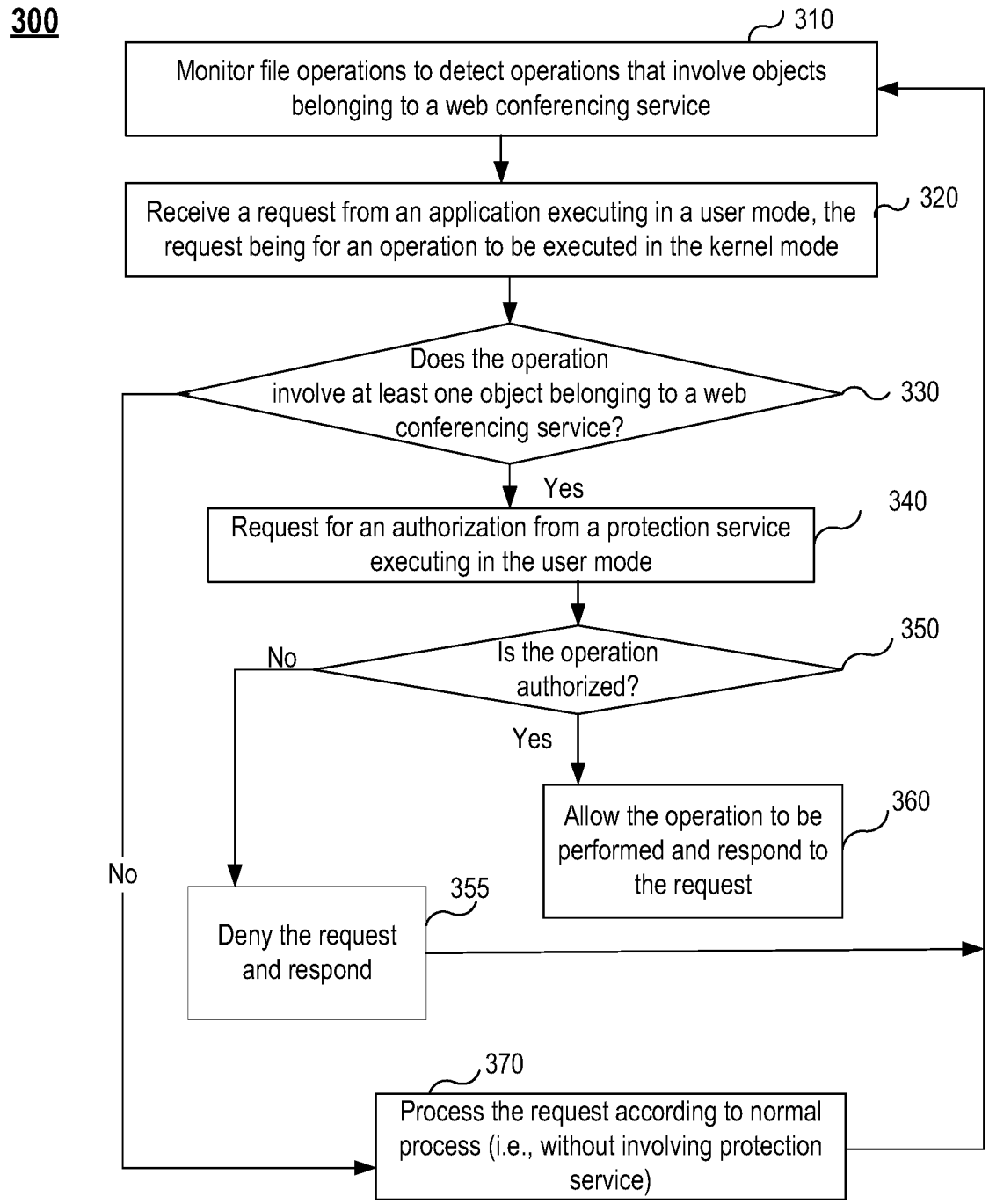
FIG. 3 is a flow diagram illustrating an exemplary method of a method for providing network protection for web-based conferencing services in accordance with aspects of the present disclosure.

FIG. 3 is a flow diagram illustrating an exemplary method 300 of a system for providing network protection for web-based conferencing services in accordance with aspects of the present disclosure.

In step 310, method 300 monitors, by a kernel driver and a file system and registry filter, file operations to detect operations that involve objects belonging to a web conferencing service.

In step 320, method 300 receives, by the kernel driver, a request from an application executing in a user mode, the request being for an operation to be executed in the kernel mode.

In step 330, method 300 determines whether or not the operation involves at least one object belonging to the web conferencing service. When the operation involves at least one object belonging to the web conferencing service, the method proceeds to step 340. Otherwise, the method proceeds to step 370.

In step 340, when the operation involves at least one object belonging to the web conferencing service, method 300 requests, by the kernel driver, for an authorization from a protection service executing in the user mode.

In step 350, method 300 determines whether or not the operation is authorized. If the operation is authorized, the method proceeds to step 360. Otherwise, the method proceeds to step 355.

In step 355, method 300 provides a response denying the requested operation.

In step 360, method 300 allows, by the kernel driver, the operation to be performed only when the authorization is received from the protection service. The method then responds to the request.

In step 370, method 300 processes the request according to normal process. For example, the request is processed without involving the protection service.

In one aspect, the monitoring is to detect file operations that inject processes, modify registry keys in an operating system of the user endpoint device, and/or modify at least one process of the web conferencing service.

In one aspect, the authorization is based on the application from which the request is received. For example, an operation allowed on Microsoft teams may be denied on Zoom.

In one aspect, the method further comprises: using a callback registration driver to register control callbacks which are called at process creation; and using the registered control callbacks for restricting access rights for creating processes and for actions during an open process. Thus, this feature is useful for restricting requested access rights for an action during an open process and/or for examining command lines prior to allowing any process to be created in the first place.

In one aspect, an authorization for injecting of codes into running processes is based on verifications of signatures of the running processes.

In one aspect, the protection service provides the authorization when the file operation is received from the application from an entity with a valid certificate. For example, the certificate may be used to preregister entities that are allowed to inject processes, modify registry keys, and so on.

In one aspect, the certificate may be based on a level of authorization. For example, a plurality of levels of authorization may be used, with each level of authorization having a respective list of permitted file operations.

In one aspect, registry keys are monitored by a filter driver such that modification of the registry key requires an authorization from the protection service.

In one aspect, the monitoring further includes monitoring to detect operations that access memory designated for confidential or personal information. For example, malicious codes may be inserted to access corporate data and/or personal information.

As described above, the present disclosure describes systems and methods for providing network protection for web-based conferencing services. One advantage of the method of the present disclosure is that the user endpoint device is protected from unauthorized alterations to processes, registry keys, system file rules, etc. Modifications that affect the endpoint device are allowed only based on authorization. The authorization may be based on certificates.

Figure 4:
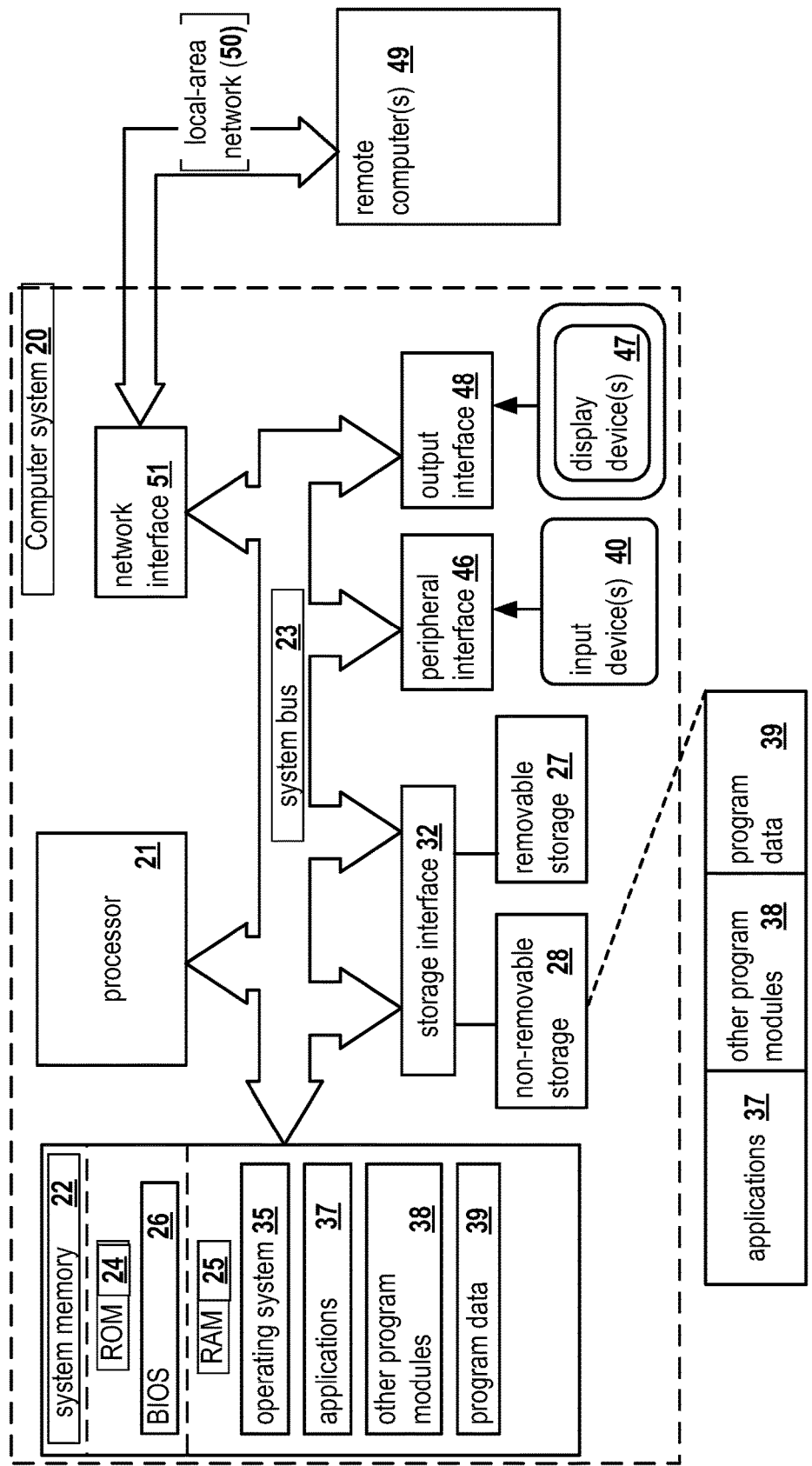
FIG. 4 presents an example of a general-purpose computer system on which aspects of the present disclosure can be implemented.

FIG. 4 is a block diagram illustrating a computer system 20 on which aspects of systems and methods providing network protection for web-based conferencing services may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing network protection for web-based conferencing services, the method comprising:
    monitoring, by a kernel driver and a file system and registry filter, file operations to detect operations that involve objects belonging to a web conferencing service;
    receiving, by the kernel driver, a request from an application executing in a user mode, the request being for an operation to be executed in the kernel mode;
    when the operation involves at least one object belonging to the web conferencing service, requesting, by the kernel driver, for an authorization from a protection service executing in the user mode, wherein the at least one object is a registry item and the operation is modifying the registry item, wherein the protection service is configured to deny the request in response to detecting, using a plurality of rules, that modifying the registry item is associated with enabling access to a meeting without permission or direct invitation; and allowing, by the kernel driver, the operation to be performed only when the authorization is received from the protection service.

2. The method of claim 1, wherein the monitoring is to detect file operations that perform at least one of: injecting processes, modifying registry keys in an operating system of the user endpoint device, and modifying at least one process of the web conferencing service.

3. The method of claim 1, wherein the authorization is based on the application from which the request is received.

4. The method of claim 1, further comprising:
using a callback registration driver to register control callbacks which are called at process creation; and
using the registered control callbacks for restricting access rights for creating processes and for actions during an open process.

5. The method of claim 1, wherein an authorization for injecting of codes into running processes is based on verifications of signatures of running processes.

6. The method of claim 1, wherein the protection service provides the authorization when the file operation is received from the application from an entity with a valid certificate.

7. The method of claim 1, wherein the monitoring further comprises:
monitoring to detect operations that access memory designated for confidential or personal information.

8. The method of claim 1, wherein the protection service is further configured to deny the request in response to:
detecting, using the plurality of rules, that modifying the registry item is associated with activating a camera and/or microphone of a computing device executing an application of the web conferencing service, or storing a recording in a storage location accessible without permission.

9. The method of claim 1, wherein the object is a file comprising code that controls transmission of audio and video content captured via the web conferencing service, wherein the operation comprises modifying the file, and wherein the protection service is configured to block modification of the file if the modifying is requested by an unauthorized entity.

10. A system of a device for providing network protection for web-based conferencing services, comprising:
a hardware processor;
an operating system (OS) operable in a user mode and a kernel mode; and
a kernel driver configured to:
monitor file operations that involve objects belonging to a web conferencing service;
receive a request from an application executing in a user mode, the request being for an operation to be executed in the kernel mode;
when the operation involves at least one object belonging to the web conferencing service, request for an authorization from a protection service executing in the user mode, wherein the at least one object is a registry item and the operation is modifying the registry item, wherein the protection service is configured to deny the request in response to detecting, using a plurality of rules, that modifying the registry item is associated with enabling access to a meeting without permission or direct invitation; and
allow the operation to be performed only when the authorization is received from the protection service.

11. The system of claim 10, wherein the monitoring is to detect file operations that perform at least one of: injecting processes, modifying registry keys in an operating system of the user endpoint device, and modifying at least one process of the web conferencing service.

12. The system of claim 10, the authorization is based on the application from which the request is received.

13. The system of claim 10, wherein the kernel driver is further configured to:
use a callback registration driver to register control callbacks which are called at process creation; and
use the registered control callbacks for restricting access rights for creating processes and for actions during an open process.

14. The system of claim 10, wherein an authorization for injecting of codes into running processes is based on verifications of signatures of running processes.

15. The system of claim 10, wherein the protection service provides the authorization when the file operation is received from the application from an entity with a valid certificate.

16. The system of claim 10, wherein the kernel driver is further configured to:
monitor to detect operations that access memory designated for confidential or personal information.

17. The system of claim 10, wherein the protection service is further configured to deny the request in response to:
detecting, using the plurality of rules, that modifying the registry item is associated with activating a camera and/or microphone of a computing device executing an application of the web conferencing service, or storing a recording in a storage location accessible without permission.

18. The system of claim 10, wherein the object is a file comprising code that controls transmission of audio and video content captured via the web conferencing service, wherein the operation comprises modifying the file, and wherein the protection service is configured to block modification of the file if the modifying is requested by an unauthorized entity.

19. A non-transitory computer readable medium storing thereon computer executable instructions for providing network protection for web-based conferencing services, including instructions for:
monitoring, by a kernel driver and a file system and registry filter of a user endpoint device, file operations to detect operations that involve objects belonging to a web conferencing service;
receiving, by the kernel driver, a request from an application executing in a user mode, the request being for an operation to be executed in the kernel mode;
when the operation involves at least one object belonging to the web conferencing service, requesting, by the kernel driver, for an authorization from a protection service executing in the user mode, wherein the at least one object is a registry item and the operation is modifying the registry item, wherein the protection service is configured to deny the request in response to detecting, using a plurality of rules, that modifying the registry item is associated with enabling access to a meeting without permission or direct invitation; and
allowing, by the kernel driver, the operation to be performed only when the authorization is received from the protection service.

* * * * *